SIGNAL SYSTEM FOR TELEPHONE LINES

Filed Oct. 26, 1951 2 Sheets-Sheet 1

Inventor
S. L. Hjertstrand
By Glascock Downing & Seebold
Attys.

July 5, 1955 S. L. HJERTSTRAND 2,712,571

SIGNAL SYSTEM FOR TELEPHONE LINES

Filed Oct. 26, 1951 2 Sheets-Sheet 2

Inventor
S. L. Hjertstrand
By [signature]
Attys.

United States Patent Office

2,712,571

Patented July 5, 1955

2,712,571

SIGNAL SYSTEM FOR TELEPHONE LINES

Svante Lennart Hjertstrand, Hagersten, Sweden, assignor to Telefonaktiebolaget L. M. Ericsson, Stockholm, Sweden, a company of Sweden Application October 26, 1951, Serial No. 253,345

Claims priority, application Sweden November 21, 1950

5 Claims. (Cl. 179—86)

The present invention relates to a receiving device for inductively generated impulses in signal systems for telephone lines. Inductively generated impulses are used on telephone lines with line transformers, and each signal consists of current impulses, the number and flow direction of which determine the meaning of the signal.

The signals are received in a device depending on the flow direction, usually a polarized relay with an intermediate position, or two flow-direction dependent relays, for example polarized relays, or relays each of which is connected in series with a rectifier. The relays usually actuate make-contacts but the invention relates to receivers with two relays, each of which actuates a break contact, the relays being connected in parallel and connected to the telephone line in such a manner that they respond to different flow-directions and break each other from the line by means of their break contacts.

Signal systems with inductively generated impulses have not proved reliable because an additional impulse having the opposite flow-direction always arises and must be neutralized. The present invention discloses a considerably better manner of receiving inductively generated impulses with different flow-directions and achieves this by means of a battery with a center tap and a circuit comprising a winding on a line transformer connected to the receiving terminal of the telephone line, and two relays connected in parallel and responsive to the flow-direction, each with a break contact, one side of the winding being connected to a contact spring in each of the break contacts and to the center tap of the battery, each one of the remaining contact springs in the break contacts being connected through an impedance to one pole of the battery, the poles being chosen so that the relay disconnected at a signal receives a voltage counteracting the operating flow-direction of the relay.

The invention will be more clearly described below with reference to the accompanying drawings Figs. 1–3.

Figure 1:
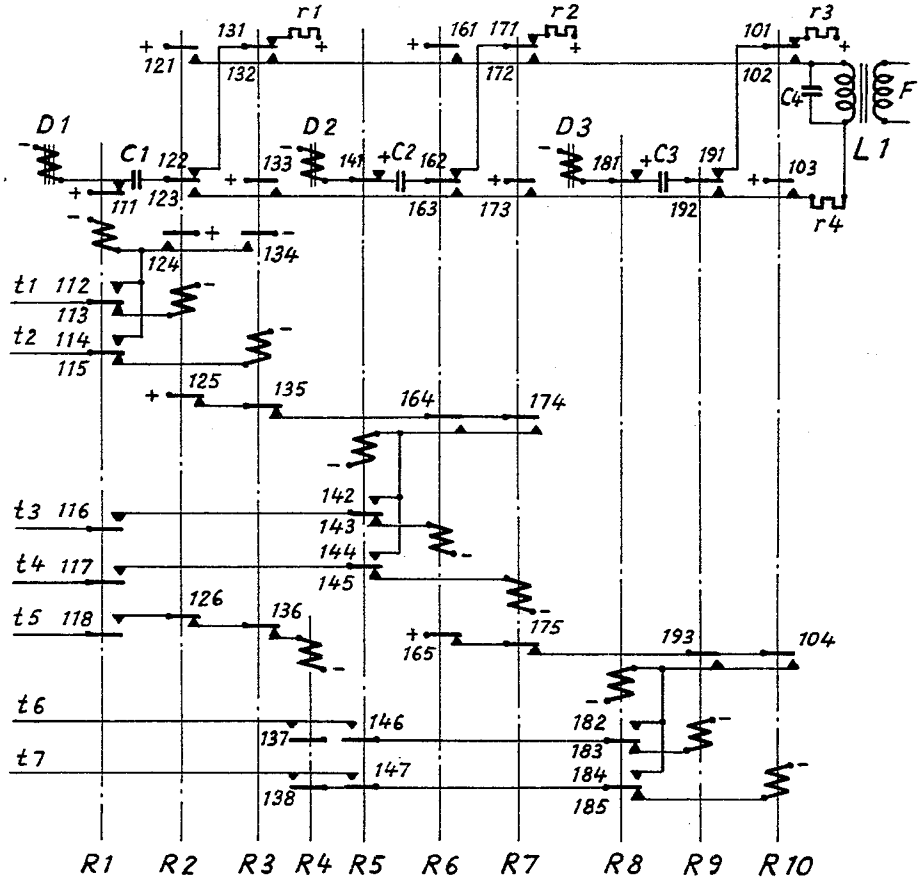
Fig. 1 illustrates a circuit showing sending devices for a signal system with 2 to 3 inductively generated impulses for each signal.

In Fig. 1 L1 is a line transformer for a junction line F. The relays R1–R10, the choke coils D1–D3 and the condensers C1–C4 pertain to the relay equipment of the junction line and are used for sending signals. By connecting the positive pole of the exchange battery to the wires *t1*–*t7* in different combinations a sending register determines the signals which have to be sent. The signals 1–10 are numerical signals corresponding to the Figures 1–9, 0, and the signals 11–12 indicate special circumstances.

Figure 3:
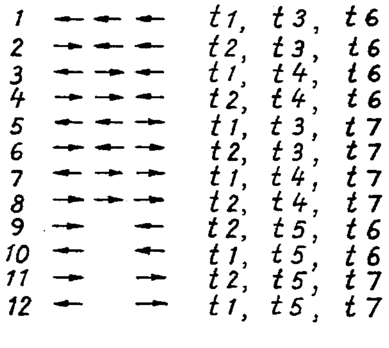
Fig. 3 illustrates the flow-direction for the current impulses in 12 different signals.

Supposing that the Figure 1 has to be sent, + is connected to the wires *t1*, *t3* and *t6* as indicated in table 1 in Fig. 3. Relay R2 attracts its armature and actuates contacts 121–126. The choke coils D1–D3 are magnetized at the beginning of the signal. The contacts 121 and 123 connect the condenser C1 and the choke coil D1 to the line transformer L1 for sending a current impulse having a certain flow-direction. Relay R1 is energized over contact 124 and actuates contacts 111–118. Contact 111 breaks the current through choke coil D1, and contact 113 breaks the current for relay R2. During the release time for relay R2, the energy in choke coil D1 is transferred to condensers C1 and C4, which are charged. Resistance *r4* is set so that condenser C4 is charged with suitable voltage. Condenser C4 is discharged through the left winding on transformer L1, a strongly damped A. C. wave being thereby sent on line F. Only the first half-period of said wave may actuate the receiving relays in Fig. 2. Relay R2 releases its armature whereas relay R1 is kept energized over wire *t1* and contact 112. Meanwhile relay R6 has attracted its armature with current over wire *t3* and contact 116. The make-time for relay R6 is so long that the first half period of the A. C. wave has passed when relay R6 actuates its contacts. When contact 125 is closed, relay R5 attracts with current over the contacts 125, 135 and 164. Contacts 141–147 are actuated. The choke coil D2 and the condenser C2 are now connected to transformer L1 by means of contacts 161 and 163. When contact 141 breaks the current through choke coil D2, the second current impulse in the signal for the Figure 1 is sent. The energy in choke coil D2 is transmitted to the condensers C2 and C4, which are charged. Condenser C4 is discharged again through the left winding on transformer L1, whereby the flow-direction of the first half period is the same as at the previous discharge. Contact 143 breaks the current for relay R6, which releases its armature. Relay R5 is kept energized over wire *t3* and contacts 116 and 142. During the release time for relay R6 and the discharge time for condenser C4 relay R9 has attracted its armature with current over wire *t6* and contacts 146 and 183, and actuated the contacts 191–193. When contact 165 closes, relay R8 attracts with current over contacts 165, 175 and 193. Contacts 181–185 are actuated. Contact 181 breaks the current through choke coil D3, the energy of which is transferred to condensers C3 and C4, which are charged during the release time for relay R9. Condenser C4 is discharged for the third time through the left winding on line transformer L1 and a third current impulse with the same flow direction as the previous impulses is sent in line F.

Relay R9 releases its armature. Relay R8 is kept energized over wire *t6* and contacts 146 and 182. The condensers C1–C3 are discharged over resistances R1–R3.

Supposing that the figure 9 has to be sent after the figure 1, the current is broken to the wires *t1*, *t3* and *t6* in the sending register, so that relays R1, R5 and R8 release their armatures. + is thereafter connected to wires *t2*, *t5* and *t6*. Relay R3 attracts and actuates the contacts 131—136. Choke coil D1 and condenser C1 are connected to transformer L1 by means of contacts 132 and 133. Relay R1 is energized over contact 134 and actuates contacts 111—118. During the release time for relay R3 the energy in choke coil D1 is transmitted to condensers C1 and C4. Condenser C4 is charged over resistance *r4* and contacts 132—133, but this time with reversed polarity, compared with the case when relay R2 was magnetized. Condenser C4 is charged through the left winding on transformer L1, the flow direction being thereby contrary to the flow direction during the sending of the figure 1. When relay R3 releases its armature, relay R4 is energized over wire *t5* and condensers 118, 126 and 136. Relay R4 is somewhat slow-operating, and therefore there is an interval between the current impulses forming the figure 9. When relay R4 attracts its armature, contacts 137—138 are actuated. Relay R9 is energized over wire *t6* and contacts 137 and 183. Contacts 191—193 are actuated. Choke coil D3 and condenser C3 are connected to transformer L1. Relay R8 is energized over contacts 165, 175 and 193 and actuates contacts 181—185. The choke coil D3 charges the condenser C4 during the release time for relay R9 and a current impulse with the same flow direction as at the sending of the figure 1 is sent over line F. Relay R8 is kept energized over wire *t6* and contacts 137 and 182.

Figure 2:
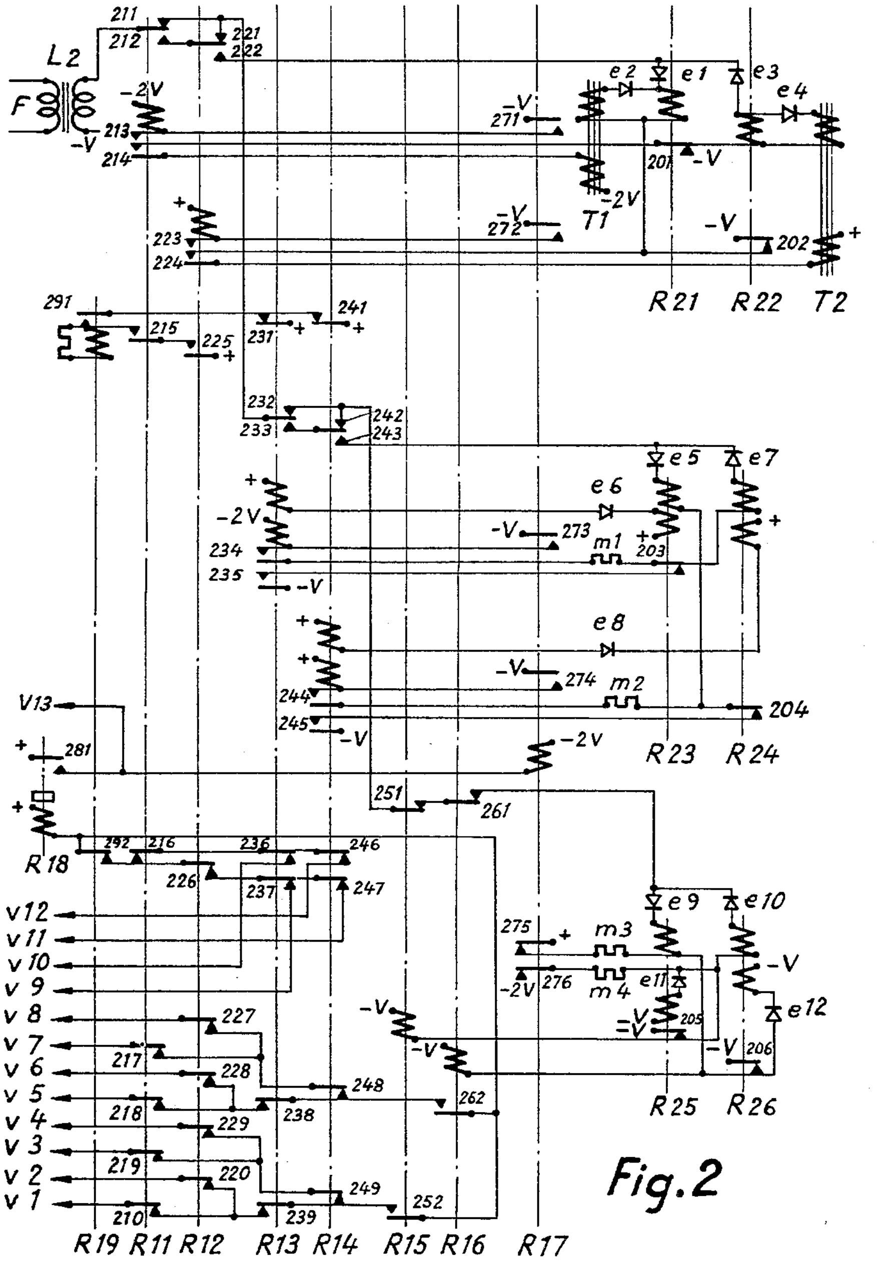
Fig. 2 illustrates a circuit showing receiving devices for the signal system, the invention having been applied to three different embodiments.

In Fig. 2, L2 is a line transformer, and the relays R11—R26, the choke coils T1 and T2 and the rectifiers *e1*—*e12* pertain to the line equipment of line F. The exchange battery has a voltage of —2V and is provided with a center tap with a voltage —V with relation to the positive pole. The wires *v1*—*v13* are connected to relays in a registering device, in which the received signals are registered. Before the beginning of the signal, sending relay R17 is closed a short while by means of a current impulse from the registering device over wire *v13*. The contacts 271—276 are actuated. Relays R11—R14 are energized over contacts 271—274 and attract their armatures, whereafter they are kept energized over their contacts 213—214, 223—224, 234—235 and 244—245 in dependence of the break contacts 201—206. Relay R19 is closed with current over contacts 215 and 225 and actuates the contacts 291—292. In the holding circuits for relays R13—R14 there are resistances *m1*—*m2* to reduce the release time of the relays. Contacts 210—219, 220—229, 231—239 and 241—249 are actuated.

At the sending of the figure 1, there comes first a current impulse from line F through transformer L2 having such a flow direction that it passes the rectifier *e1* and actuates relay R21 in the following circuit: —V, the right winding on transformer L2, contacts 212 and 222, rectifier *e1*, winding on relay R21, contact 202. Relay R21 actuates contact 201, which breaks the current for relay R11 and the current through the lower winding on choke coil T1, which induces a current through its upper winding and rectifier *e2*; the winding on relay R21 has such a direction, that relay R21 remains attracted during a sufficiently long time for relay R11 certainly having time to release its armature.

At the same time the second half-period in the A. C. wave, the first half-period of which actuated relay R21, is nullified by a counter-voltage in the following circuit: —V, the right winding on transformer L2, contacts 212 and 222, rectifier *e3*, winding on relay R22, contacts 213 and 214, winding on relay R11 and respectively the lower winding on choke coil T1 to —2V. The second half-period can never attain such a voltage that the counter voltage —V is balanced, and therefore is without effect. When relay R11 releases its armature, the second half-period of the A. C. wave has passed. Contact 211 closes and the following current circuit, which at the sending of the figure 1 has the same flow direction as the previous one, actuates relay R23 in the following circuit: —V, the right winding on transformer L2, contacts 211, 233 and 243, rectifier *e5*, the upper winding on relay R23, contacts 204 and 245. Relay R23 actuates contact 203, which breaks the current for relay R13. A current through the upper winding on relay R13, rectifier *e6* and the lower winding on relay R23 is thereby induced. Said current keeps relay R23 attracted until relay R13 releases its armature. During the release time for relay R13 relay R24 is prevented from actuating by a counter-voltage in the following circuit: —V, the right winding on transformer L2, contacts 211, 233 and 243, rectifier *e7*, the upper winding on relay R24, resistance *m1*, contact 234, the lower winding on relay R13, to —2V. When relay R13 releases its armature the circuit for the upper winding of relay R24 is broken in contacts 234—235, and thus it is certain that a following half period in the A. C. wave will not actuate relay R24. When relay R11 released its armature the current for relay R19 was broken. This relay is however somewhat slow-releasing, and therefore does not have time to release if one of the relays R13—R14 releases immediately thereafter as has been described. When relay R13 has released its armature the following circuit is closed, in which relay R25 is actuated by the third current impulse in the signal for the figure 1: —V, the right winding on transformer L2, contacts 211, 232, 251 and 261, rectifier *e9*, the upper winding on relay R25, contact 206. Relay R25 actuates contact 205 and opens the short-circuit for its lower winding, whereafter the relay remains actuated through the following circuit: —2V, contact 276, resistance *m4*, rectifier *e11*, the lower winding of relay R25, to —V. At the same time, relay R15 is energized in the following circuit: —2V, resistance *m4*, winding on relay R15, to —V. Relay R15 actuates contacts 251—252. During the release time for relay R15 there is a counter-voltage preventing relay R26 from actuating in the following circuit: —V, the right winding on transformer L2, contacts 211, 232, 251 and 261, rectifier *e10*, the upper winding on relay R26, resistance *m4*, contact 276 to —2V.

When contact 252 is closed, a circuit is closed for a registering relay in the registering device from + through the winding on relay R18, over contacts 252, 239 and 210 and wire *v1*. Relay R18 attracts its armature and actuates contact 281 simultaneously with the figure 1 being registered in the registering device. Relay R17 is energized and actuates the contacts 271—276, whereby relays R11 and R13 are actuated again and relays R15 and R25 release their armatures. The current for relay R18 is broken. Relays R18 and R17 release their armatures. The receiving relays R11—R19 are thereafter ready to receive a new signal.

It has been assumed in the preceding that the second signal represented the figure 9. The first current impulse in said signal has a flow direction contrary to the flow-direction of the signals sent for the figure 1 and actuates relay R22 instead of relay R21. Contact 202 breaks the current for relay R12 and the lower winding on the choke coil T2. A current is induced through the winding on relay R22, rectifier *e4* and the upper winding on choke coil T2, relay R22 being thereby kept actuated until relay R12 has released its armature. During the release time for relay R12 relay R21 is energized with a counter voltage in the following circuit: —V, the right winding on transformer L2, contacts 212 and 222, rectifier *e1*, winding on relay R21, contacts 223—224, winding on relay R11 and respectively the lower winding on the choke coil T2 to +. When relay R12 releases, the current is broken for relay R19 and, since there follows an interval due to the operating time of relay R4 in Fig. 1, relay R19 releases its armature. The following current impulse has the same flow direction as at the sending of the Figure 1 and actuates relay R23. Relay R13 releases its armature and the following circuit is closed: +, winding on relay R18, contacts 292, 226 and 237, wire *v9* to a relay in the registering device. Relay R18 actuates contact 281 again and the figure 9 is registered. Relay R17 actuates the contacts 271—276 and relays R12 and R13 attract again. The current for relay R18 is broken and relays R18 and R17 release their armatures.

I claim:

1. In a telephone system a transformer, a transmitting line terminating in a first winding on said transformer, a sender sending direct current impulses of different polarity over said transmitting line, a receiver connected to a second winding on said transformer, said receiver comprising two receiving relays one for each impulse polarity and connected in parallel to the said transformer whereby such relays operate individually for respective different impulse polarities, each of the said receiving relays having respective break contacts connected to disconnect each other, a battery having two terminals and a center tap, said center tap connected to said relay break contacts and to one side of said second winding on said transformer, two impedances connected respectively one to each of said battery terminals and to respective relay break contacts, said terminals being so selected that the receiving relay which was disconnected by the response of the other receiving relay to its respective polarity is connected to a voltage bucking the operating voltage of such disconnected relay.

2. The invention as set forth in claim 1 wherein the said impedances are so connected that the said receiving relay responding to its respective polarity carries an induced current aiding its operating current.

3. The invention as set forth in claim 1 wherein a rectifier is connected in series with each of said receiving relays to insure the response thereof to respective polarities.

4. The invention as set forth in claim 3 wherein the said impedances comprise a plurality of windings inductively coupled on an iron core.

5. In a telephone system a transformer, a transmission line terminating on a first winding on said transformer, a sender transmitting direct current impulses of different polarity over said transmission line, a receiver connected to a second winding on said transformer, said receiver comprising two receiving relays each responsive to respective impulse polarities and connected in parallel to said second winding, two cut-off relays controlled by said receiving relays and each having a contact connected to disconnect both said receivinng relays from said second winding, means connected to hold said operated receiving relays at least until the corresponding cut-off relay has disconnected the same, a break contact on each of said receiving relays to disconnect the respective other receiving relay, two batteries connected in series with an impedance in parallel to each one of said break contacts with such polarity that when one receiving relay is responsive to a signal the other receiving relay is connected to a battery voltage having a polarity bucking the operating voltage of such other receiving relay.

References Cited in the file of this patent

UNITED STATES PATENTS

| | | |
|---|---|---|
| 2,186,315 | Baloun | Jan. 9, 1940 |
| 2,236,797 | Kudrna | Apr. 1, 1941 |